(12) United States Patent
Liang et al.

(10) Patent No.: US 6,842,290 B2
(45) Date of Patent: Jan. 11, 2005

(54) MULTI-AXIS IMAGING SYSTEM HAVING INDIVIDUALLY-ADJUSTABLE ELEMENTS

(75) Inventors: Chen Liang, Tucson, AZ (US); Artur G. Olszak, Tucson, AZ (US); James Goodall, Tucson, AZ (US)

(73) Assignee: Dmetrix, Inc., Tucson, AZ (US)

( * ) Notice: Subject to any disclaimer, the term of this patent is extended or adjusted under 35 U.S.C. 154(b) by 0 days.

(21) Appl. No.: 10/425,757

(22) Filed: Apr. 29, 2003

(65) Prior Publication Data

US 2004/0223226 A1 Nov. 11, 2004

Related U.S. Application Data

(60) Provisional application No. 60/412,615, filed on Sep. 18, 2002.

(51) Int. Cl.[7] .............................................. G02B 27/10
(52) U.S. Cl. ...................................... 359/619; 359/626
(58) Field of Search ................................ 359/619, 621, 359/622, 626

(56) References Cited

U.S. PATENT DOCUMENTS

| | | | | |
|---|---|---|---|---|
| 5,059,008 A | | 10/1991 | Flood et al. ................. | 359/196 |
| 5,206,983 A | | 5/1993 | Guckel et al. ................. | 29/589 |
| 5,327,033 A | | 7/1994 | Guckel et al. ......... | 310/40 MM |
| 5,796,521 A | * | 8/1998 | Kahlert et al. .............. | 359/619 |
| 5,861,992 A | * | 1/1999 | Gelbart ........................ | 359/619 |
| 5,917,260 A | | 6/1999 | Garcia et al. .................. | 310/80 |
| 6,424,404 B1 | | 7/2002 | Johnson ........................ | 355/44 |
| 6,517,665 B1 | | 2/2003 | Boehme et al. ............. | 156/345 |
| 6,633,435 B2 | * | 10/2003 | Akiyama et al. ........... | 359/619 |

FOREIGN PATENT DOCUMENTS

| | | |
|---|---|---|
| DE | 0707228 A1 | 4/1996 |
| WO | WO 0042618 | 7/2000 |
| WO | WO 02075370 A2 | 9/2002 |

OTHER PUBLICATIONS

The MEMS Handbook, CRC Press (Sep. 2001), pp. 18–34 to 18–40.
International Conference on Solid State Sensors and Actuators (1997), Transducers '97, IEEE, Ernest J. Garcia, Todd R. Christenson, Marc A. Polsky, Andres A. Jojola, Sandia National Laboratories, "Design and Fabrication of a LIBGA Milliengine," pp. 765–768.
H. Guckel, K.J. Skrobis, T.R. Christenson, J. Klein, Micromechanics for Actuators Via Deep X–ray Lithography (Invited Paper), Wisconsin Center for Applied Microelectronics, SPIE vol. 2194, pp. 2–9.

* cited by examiner

*Primary Examiner*—Huy Mai
(74) *Attorney, Agent, or Firm*—Birdwell & Janke, LLP

(57) ABSTRACT

A multiple-axis imaging system having individually-adjustable optical elements and a method for individually adjusting optical elements of the system. The system comprises a plurality of optical elements having respective optical axes and being individually disposed with respect to one another to image respective sections of an object, and a plurality of individually-operable positioning devices corresponding to respective optical elements for positioning the optical elements with respect to their respective optical axes. The positioning devices are specifically adapted to adjust the axial position, lateral position and angular orientation of the optical elements with respect to their respective optical axes. The system is particularly adapted for use as a microscope array, and the positioning devices may be micro-actuators.

50 Claims, 18 Drawing Sheets

Spot Diagram

Spot Diagram

SPOT DIAGRAM

Spot Diagram

Spot diagram

SPOT DIAGRAM

SPOT DIAGRAM

MULTI-AXIS IMAGING SYSTEM HAVING INDIVIDUALLY-ADJUSTABLE ELEMENTS

CROSS REFERENCE TO RELATED APPLICATION

This application claims the benefit of priority under 35 U.S.C. § 119 to U.S. Provisional Application No. 60/412,615, filed Sep. 18, 2002, the entire contents of which are incorporated by reference.

BACKGROUND OF THE INVENTION

This invention relates to the adjustment of optical elements in a multi-axis imaging system, particularly the optical elements of an array microscope.

In a multi-axis imaging system, as that term is used herein, a plurality of optical elements are arranged in an array so as to image respective portions of a common object. One advantage of such a system is that all of the elements of the array can have a fixed relationship to one another and may be moved in unison to scan an object and bring its image into focus at a desired image plane. In particular, in an array microscope an array of miniature microscope objectives is employed instead of a single objective to achieve high resolution, without the mechanical drawbacks of a single, equivalent objective, and to scan a large field of the object more rapidly than can be achieved with a single objective. Such an array microscope is disclosed in PCT Patent Publication No. WO 02/075370, published Sep. 26, 2002.

The performance of an optical system is dependent on how well the lenses are aligned, both laterally and axially. The performance is also dependent on the symmetry of lenses. In the case of a single-axis optical system, axial and lateral alignment of the lenses is straightforward. However, in a multi-axis imaging system, separate alignment of individual optical elements, and lenses within an optical element, is inherently counter to the concept of disposing the optical elements of an array in a fixed relationship so that that they can be moved in unison and, thence, presents a difficult challenge.

Yet, individual alignment of the elements of a multi-axis imaging system would be desirable to overcome a number of performance problems. One such problem is that it is difficult to construct an array of lenses wherein all of the lenses are laterally spaced within an acceptable tolerance. Consequently, random displacement of the images of respective elements may degrade system performance. Another problem is that it is difficult to construct an array of lenses all of which are the same shape within an acceptable tolerance. Again, random variation in lens shapes may degrade system performance.

A problem of particular importance in microscopes is that either the thickness of the glass slide on which a specimen is mounted, or the surface of the specimen itself, may be sufficiently non-uniform that the portion of interest of one portion of an object may lie outside the depth of field of the microscope when focused on another portion of the object. It is straightforward to compensate for this non-uniformity with a single-axis optical system by simply refocusing the system when the object, or the system, is moved laterally. However, in an array microscope the overall field of view may be such that, because of slide or object non-uniformities, portions of an object imaged by one set of optical elements may be in focus, while other portions of the object imaged by another set of optical elements are out of focus, thereby degrading the overall image of the object.

Accordingly, there is a need for a multi-axis imaging system that provides the advantages of both moving the elements of the array in unison, and adjusting the adjusting the array elements individually.

SUMMARY OF THE INVENTION

The present invention fulfills the aforementioned need by providing a multiple-axis imaging system having individually-adjustable optical elements, comprising a plurality of optical elements having respective optical axes and being individually disposed with respect to one another to image respective sections of an object, and a plurality of individually-operable positioning devices corresponding to respective optical elements for positioning the optical elements with respect to their respective optical axes. The positioning devices are specifically adapted to adjust the axial position, lateral position and angular orientation of the optical elements with respect to their respective optical axes. The positioning devices may be made by the LIGA process. In a preferred embodiment, the plurality of optical elements comprise microscope elements so as to form a microscope array.

A method is provided for modifying the quality of images produced by a multi-axis imaging system having a plurality of optical elements and respective optical axes, comprising adjusting the positions of the optical elements individually with respect to their respective optical axes so as to modify their respective image qualities at a common image plane. The method includes adjusting the axial position, lateral position and angular orientation of the optical elements with respect to their respective optical axes to modify image quality. The method also comprises selecting and arranging the optical elements so as to perform as microscope elements. In accordance with the method, the axial position, lateral position and angular orientation of respective microscope elements may be individually adjusted with respect to the common image plane and their respective optical axes to compensate for fabrication and assembly errors in one or more of the microscope elements. The adjustments may be made by a predetermined amount based on one or more measured parameters of respective microscope elements, or they may be based on analysis of image quality in real to time. The adjustments may be made to change the working distance of the microscope to compensate for object irregularity, based on, for example, measurement of the surface profile of the object; to compensate for the thickness of an object; or to reduce the effect of spherical aberration of the microscope that contains said microscope element due to cover glass thickness variation.

The objects, features and advantages of the invention will be more fully understood upon consideration of the following detailed description of the invention taken in conjunction with the accompanying drawings.

DETAILED DESCRIPTION OF THE INVENTION

Although the present invention may be applicable to a variety of multi-axis imaging systems, it is particularly advantageous in miniature microscope arrays wherein a plurality of miniature microscopes are arranged in an array and, heretofore, coupled so as to have a fixed relationship with one another. Accordingly, while the invention is hereafter described in terms of a miniature microscope array, particularly used as an array microscope, it is to be understood that any multi-axis imaging system may fall within the scope of this invention.

Figure 1:
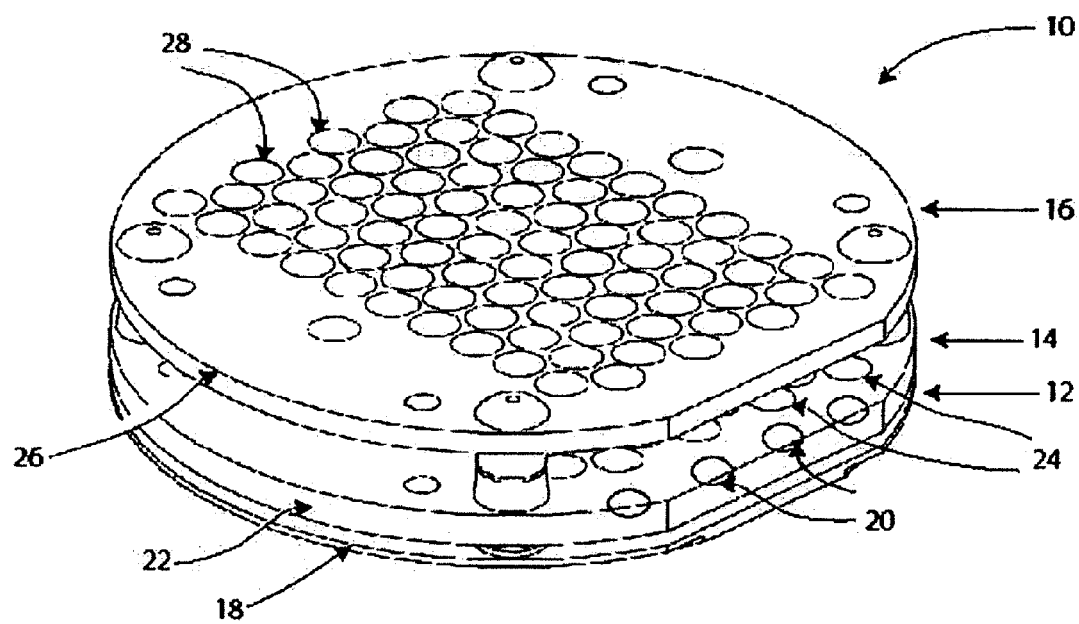
FIG. 1 is an illustration of an array of optical elements for an array microscope.

An exemplary miniature microscope array 10 is shown in FIG. 1. It comprises three sub-arrays, 12, 14 and 16, each comprising a substrate and one of three respective lenses for each of the optical elements of the microscope array 10. Thus, for each element of the microscope array, substrate 18 supports a bottom lens 20; substrate 22 supports a middle lens 24; and substrate 26 supports a top lens 28; and the respective lenses of each of the three sub-arrays are, ideally, aligned with one another along respective optical axes. The lenses may be formed as an integral part of the substrate, or may be discrete elements mounted on their respective substrates. In any case, they have previously had fixed positions on their respective substrates, which have had fixed positions with respect to one another.

The present invention enables both lateral and longitudinal translation of individual lenses by providing respective individual longitudinal and lateral motion actuators. In the case of miniature microscope arrays, the actuators are micro-actuators, as illustrated schematically in FIGS. 2 and 3.

Figure 2:
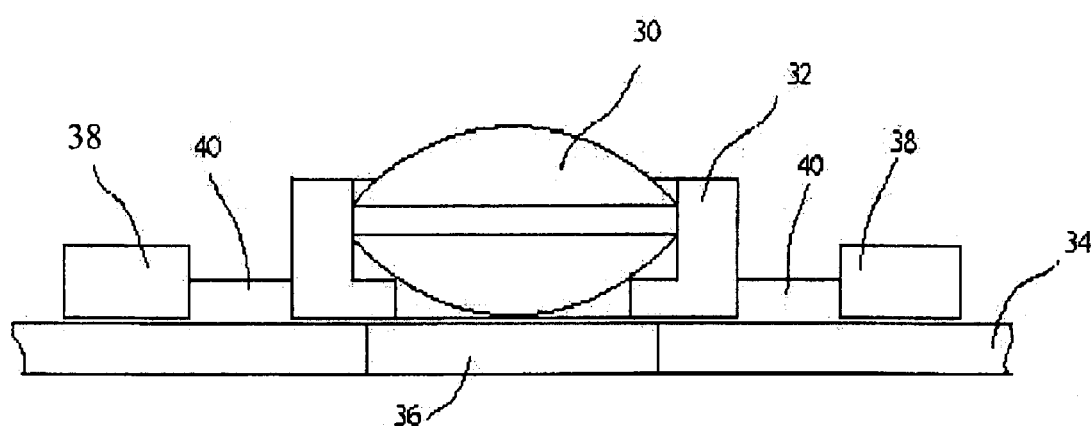
FIG. 2 is a schematic diagram of one element of a lens array mounted on an array substrate and having a micro-actuator for translating the lens laterally.

Turning specifically to FIG. 2, a miniature lens 30 of an optical element of a microscope array is mounted in a socket 32 that is supported by a substrate 34 over an aperture 36 there through so as to move laterally in two dimensions over the aperture. One or more miniature motors 38 are coupled by respective links 40 to the socket so as to impart lateral motion to the lens. The motor may be powered by any suitable means, such as an electrical current. Thus, each lens of one or more of the sub-arrays 12, 14 and 16 described above may have one of these micro-actuators so that, while all of the lenses may be moved in unison as an array, the individual arrays may be moved laterally individually as well.

Figure 3:
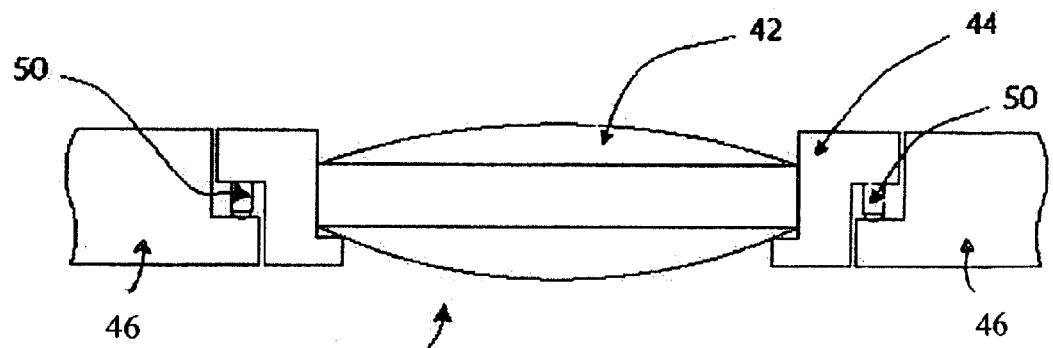
FIG. 3 is a schematic diagram of one element of a lens array mounted on an array substrate and having a micro-actuator for translating the lens axially.

Similarly, FIG. 3 shows a miniature lens 42 mounted in a socket 44 that is supported by a substrate 46 over an aperture 48 there through so as to move axially. One or more miniature motors 50 are disposed between the substrate 46 and the socket 44 so as to impart axial motion to the lens. Thus, each lens of an array may be moved axially individually, as well as in unison with the other lenses of the array.

Figure 4:
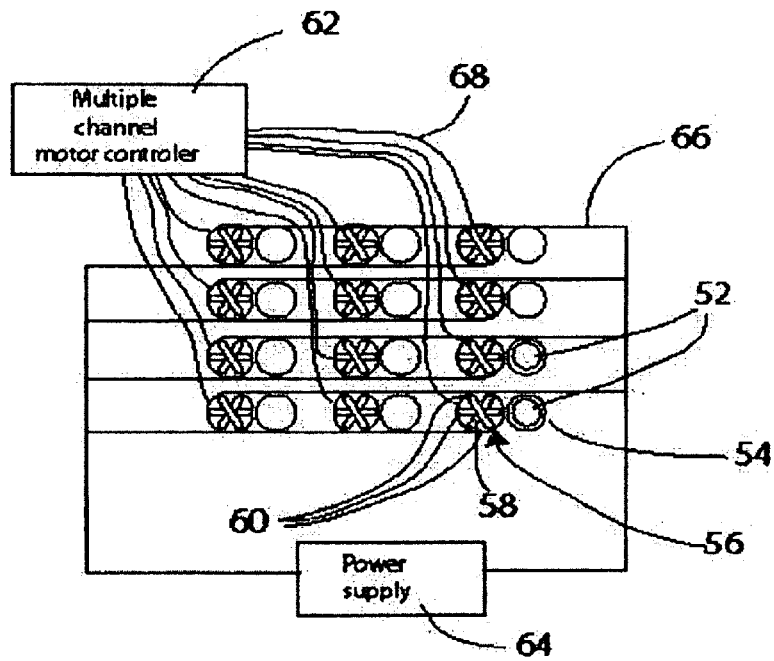
FIG. 4 is a schematic diagram of several elements of a lens array mounted on an array substrate and having respective micro-actuators for rotating the lenses.

The present invention also enables rotational motion of individual lenses. Referring to FIG. 4, miniature lenses 52 are mounted in rotatable sockets 54 that are coupled, by a gear for example, to respective rotational motors 56 so as to be rotated thereby. Each motor 56 may comprise, for example, a rotor 58 and a plurality of radially-extending electro-magnetic stators 60 energized in sequence by a multiple-channel controller 62 and power supply 64 to cause the rotor to rotate, as is well understood in the electrical engineering art. Electrical connections 66 and 68 may be fabricated on an array substrate by, for example, well-known methods of lithography.

A combination of multiple types of motions, such as two directional translations and rotation, can be incorporated for individual lenses if space permits. For example, the lenses on sub-array 14 can be translated axially and laterally, and can be rotated. Alternatively, different lenses in the microscope may be equipped with only one type of motion. For example, lenses on sub-array 12 can be translated axially while lenses on sub-array 14 can be translated laterally and lenses on sub-array 16 can be rotated. It is to be understood that, throughout this specification and the claims, the terms "position" and "positioning" are used in their broad sense generally to encompass any or any combination of axial position or positioning, lateral position or positioning, angular orientation or orienting, and tilt or tilting, unless otherwise indicated expressly or by context.

Although suitable micro-actuators of the type illustrated in FIGS. 2, 3 and 4 might be fabricated for a specific application in a variety of ways, one known technology for fabricating such actuators is the so-called LIGA process. LIGA is an acronym derived from the German words for lithography, electroforming, and molding. The fabrication of micro-mechanical devices using this technology is illustrated, for example, in Boehme et al. U.S. Pat. Nos. 6,517,665B1: 6,332,568 B1; 5,917,269; 5,206,983; and Guckel et al. U.S. Pat. No. 5,327,033; all of which are hereby incorporated incorporated by reference in their entireties. This and other suitable micro-fabrication technologies are described in The MEMS Handbook, Mohamed Gad-el-Hak ed., CRC Press, New York, 2001, ISBN 0-8493-0077-0, hereby incorporated by reference in its entirety.

Figure 5:
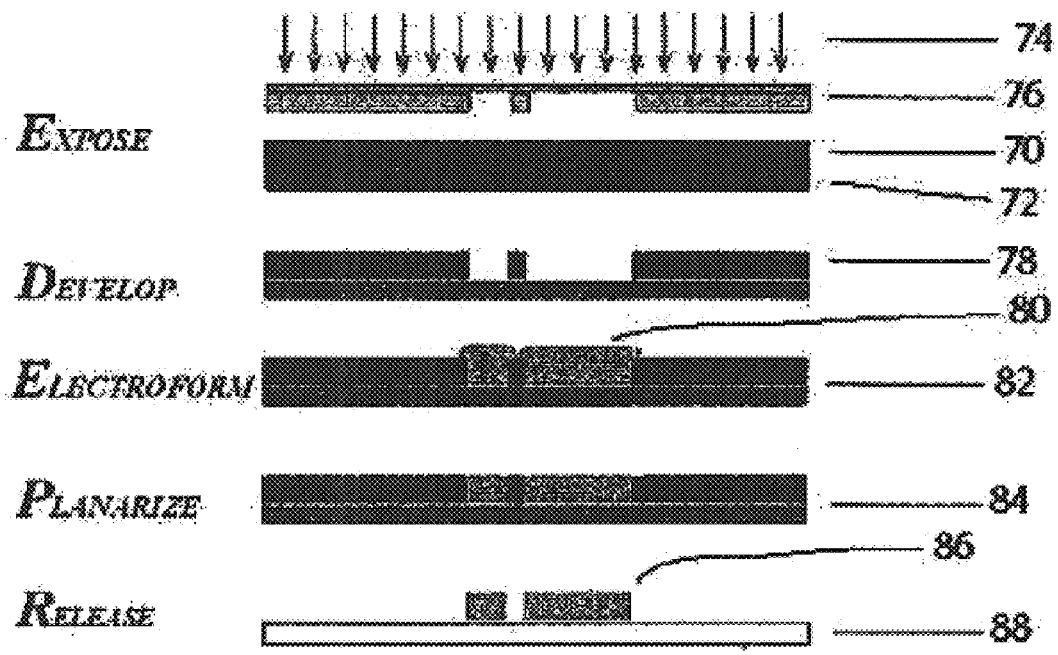
FIG. 5 is a schematic diagram of the basic LIGA process.
Figure 6:
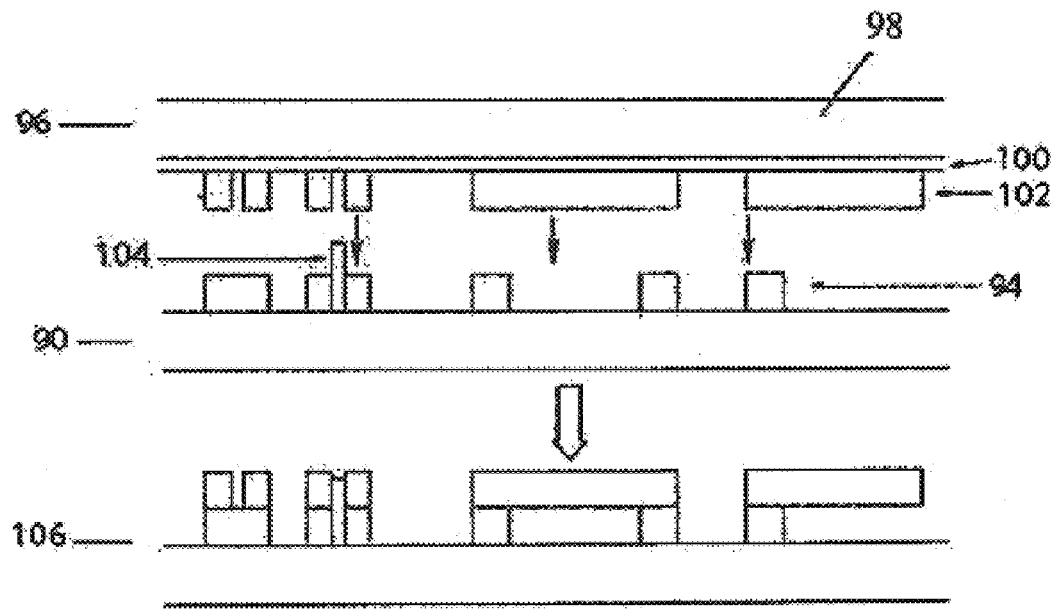
FIG. 6 is a schematic diagram of the fabrication of a two-layer part using the LIGA process.

The LIGA process is illustrated in FIGS. 5 and 6. LIGA employs a multi-step lithography process. First, a layer 70 of photosensitive material, such as polymethylmethacrylate ("PMMA"), is placed on a substrate of, for example, silicon nitride, 72. The photosensitive material is then exposed to ultra-violet or x-ray radiation 74 through a mask 76. The mask is typically made of a gold-plated substrate. The exposed areas can then be removed through a development process, as is well known in the art, leaving a formed part 78. Although the formed part 78 may be the final part, a complementary part may also be electroformed using part 78. In this case, the voids in part 78 are filled with metal 80 using the well-known electroplating process. The top of a first intermediate product 82 is then polished to the desired thickness and surface quality, to produce a second intermediate product 84. The remaining portion of photosensitive material is then removed, typically by chemical etching, leaving the metal features 86 on the substrate 72 to form the final product 88.

Parts fabricated with the LIGA process can be formed into multi-layer structures by manufacturing a number of layers in separate exposures and subsequently stacking them on top of each other. This is illustrated in FIG. 5. First, a lower part 90, having a substrate 92 and features 94, is formed as described above, with or without electroplating. Second, an upper part 96, having substrate 98, a sacrificial layer 100 and features 102, is similarly formed. One or more alignment pins 104 are provided to align the upper and lower parts when they are brought together so that they register with one another properly. Once the two parts have been combined, they can be made to diffusion bond by providing the proper temperature and pressure, thereby creating one integrated part. The substrate 98 of the top part 96 may then be removed by etching the sacrificial layer 100, leaving a final multi-layer part 106. For example, the final part may be made entirely of nickel, where the lower substrate 92 is made of nickel, the upper substrate 98 is made of alumina, the sacrificial layer 100 is made of copper, and the features are made of electroplated nickel. It is to be recognized that the structure shown in FIG. 6 is exemplary of the process only, and that the process as described may be used to fabricate appropriate micro-actuators of the type represented by FIGS. 2, 3 and 4 for individual adjustment of lenses in an optical micro-array.

Figure 7A:
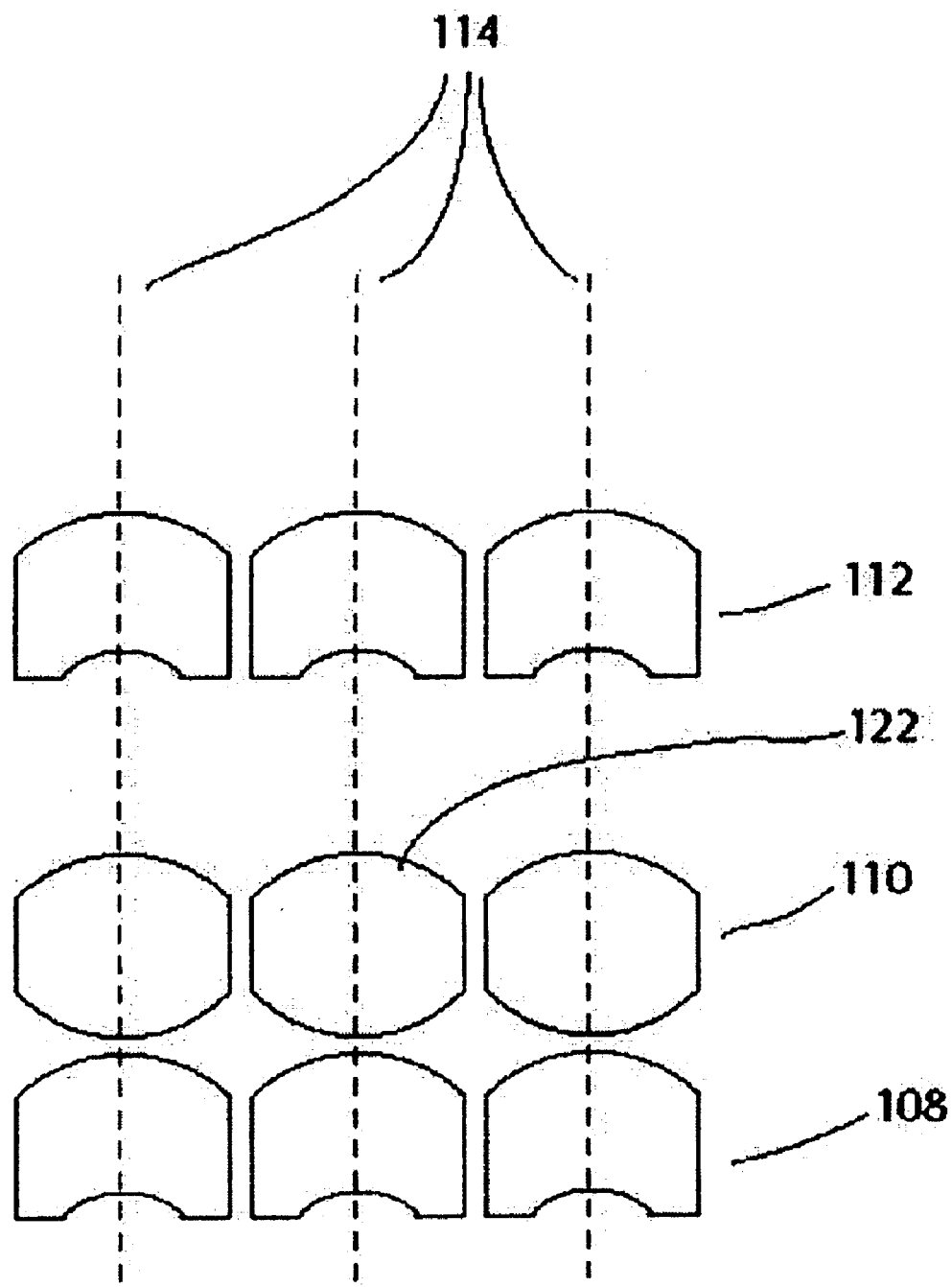
FIG. 7(a) is a cross section of three elements of an array microscope in perfect alignment.
Figure 7B:
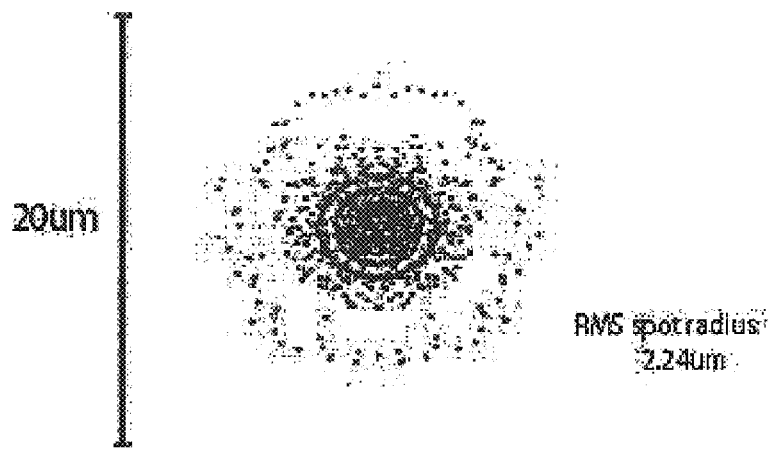
FIG. 7(b) is a geometric spot diagram for each of the elements of the array shown in FIG. 7(a).
Figure 7C:
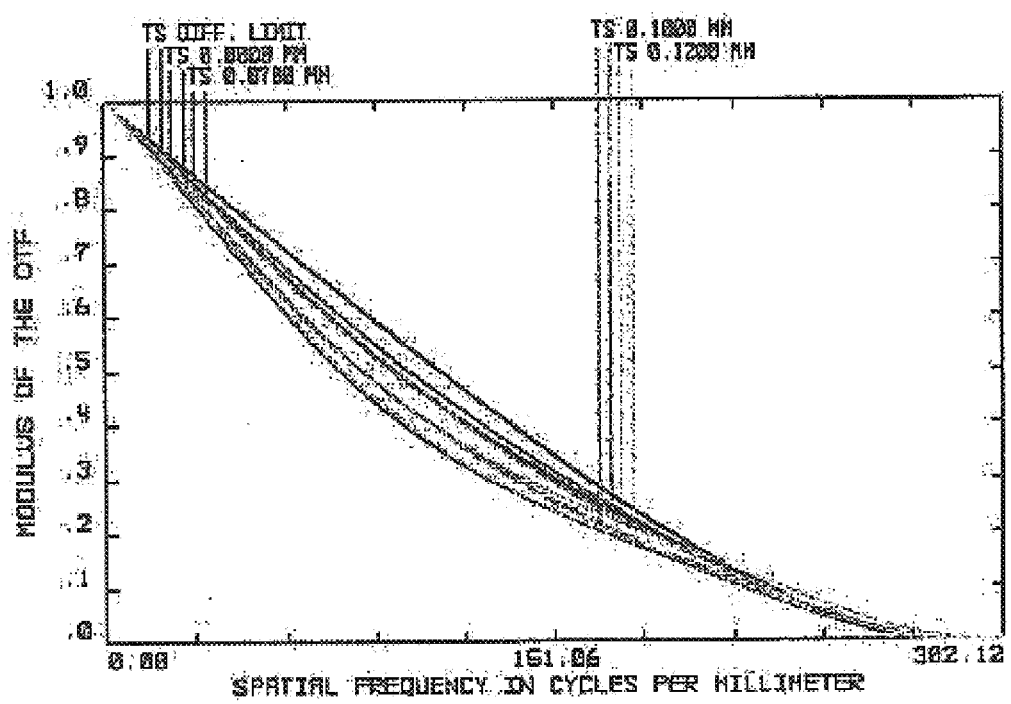
FIG. 7(c) is a diagram of the modulation transfer function ("MTF") for each of the elements of the array shown in FIG. 7(a).

The quality of an image produced by a multi-element microscope objective depends, in part, on how well the lenses are aligned laterally. Without the ability to translate individual lenses in an array laterally, fabrication errors in lens position and misalignment during assembly can significantly degrade the optical performance. For example, three optical elements of an array of three-element miniature microscope objectives are shown in FIG. 7(a). Each objective comprises a bottom lens 108, a middle lens 110 and a top lens 112, and each objective has an optical axis 114. The prescription for each objective is given in Table 1. For optimal performance, the three lenses of each objective need to be aligned with one another. FIG. 7(b) and FIG. 7(c) show the optical performance of each objective, in the form of a geometric spot diagram and an MTF plot, respectively, assuming that all of the lenses are perfectly aligned.

TABLE 1

| Surf | Radius | Thickness | Glass | Diameter | Conic | 4th order | 6th order |
|---|---|---|---|---|---|---|---|
| OBJ | Infinity | 0.1500 | BK7 | 0.240 | 0 | | |
| 1 | Infinity | 0.2003 | | 0.386 | 0 | | |
| 2 | −1.422 | 1.0000 | ZEONEXE48R | 0.644 | 0 | | |
| 3 | −0.737 | 0.0500 | | 1.386 | −0.23 | | |
| 4 | 1.871 | 1.7000 | ZEONEXE48R | 1.601 | −2.82 | | |
| STO | −1.66 | 2.8440 | | 1.497 | 0 | 0.018 | 0.017 |
| 6 | −0.621 | 1.0000 | ZEONEXE48R | 0.982 | 0 | | |
| 7 | −1.276 | 2.2939 | | 1.580 | 0.5 | | |
| IMA | Infinity | | | 1.717 | 0 | | |

Figure 8A:
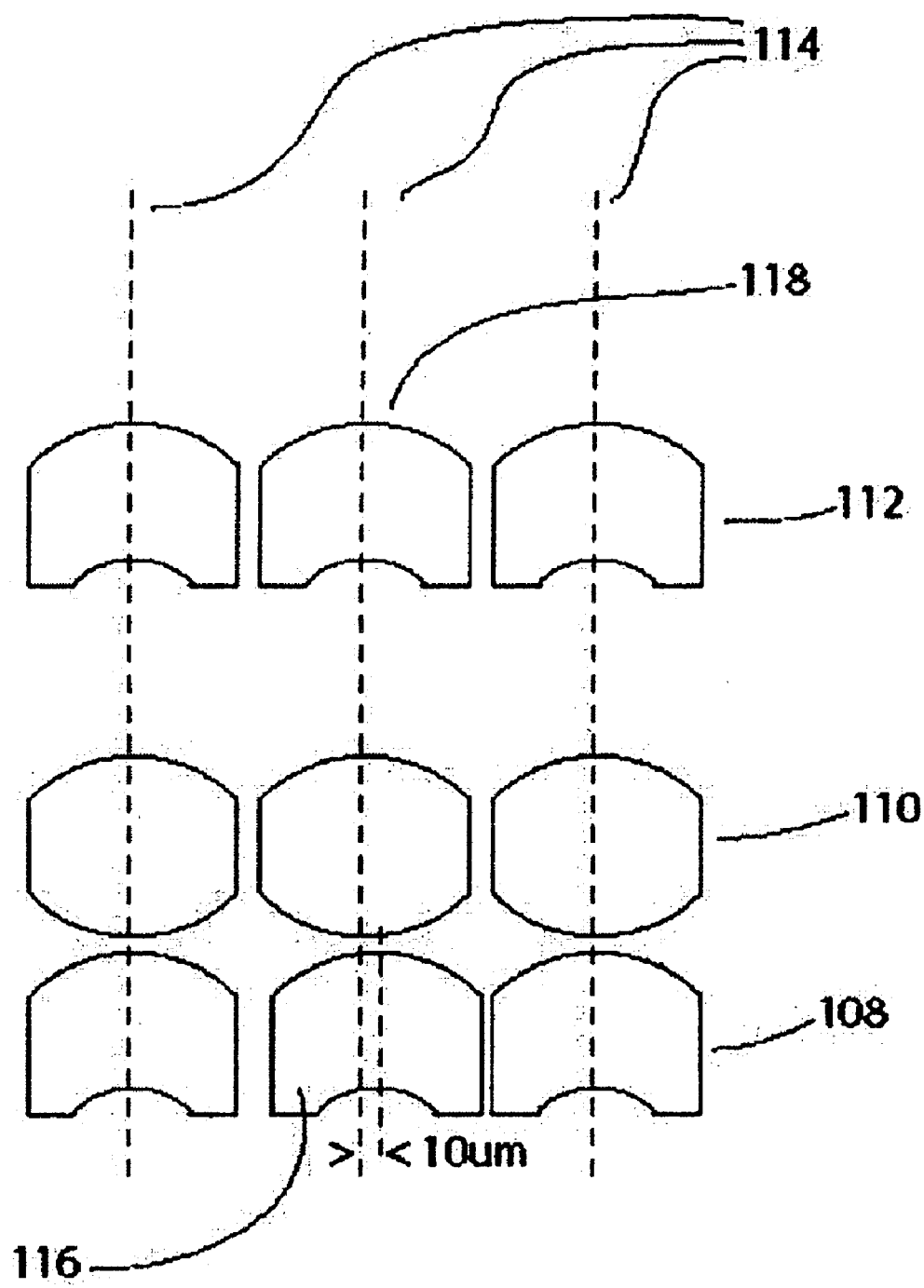
FIG. 8(a) is a cross section of three elements of an array microscope wherein one lens of one of the elements is decentered.
Figure 8B:
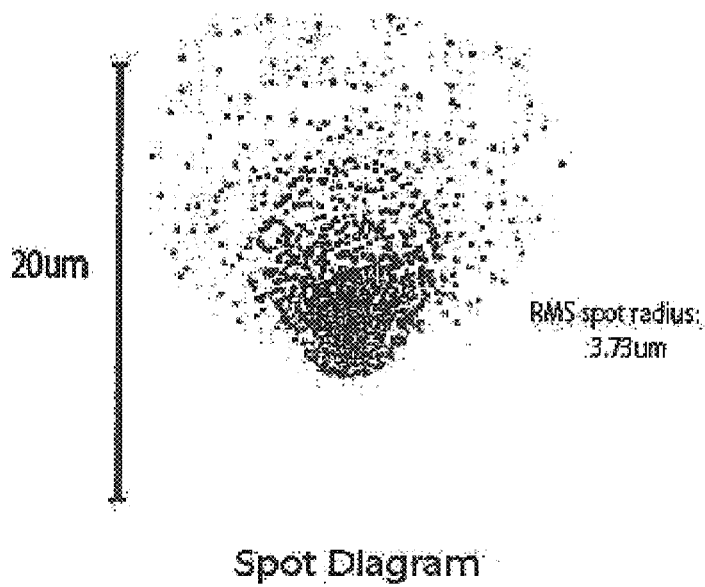
FIG. 8(b) is a spot diagram for the element of the array shown in FIG. 8(a) wherein in one lens is decentered.
Figure 8C:
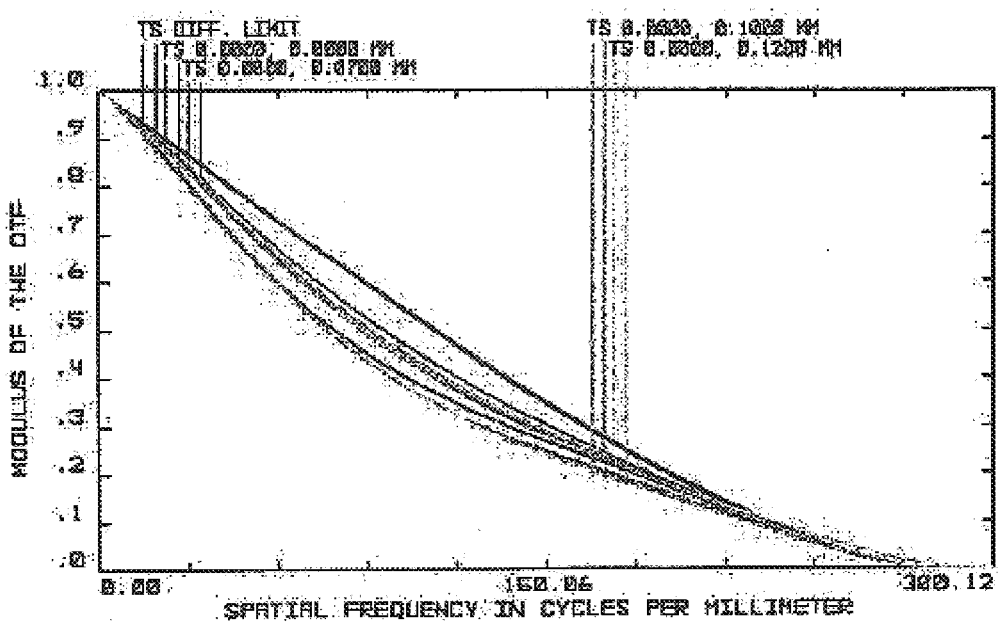
FIG. 8(c) is an MTF plot for the element of the array shown in FIG. 8(a) wherein one element is decentered.

On the other hand, the optical performance degrades if one or more of the lenses are decentered, as shown in FIG. 8(a). In this case, bottom lens 116 of objective 118 is laterally displaced from the optical axis of the objective by, for example, 10 micrometers. It can be seen from the spot diagram of FIG. 8(b) and the MTF plot of FIG. 8(c) that the performance of objective 118 is degraded, in that the image spot has become larger and asymmetrical and the modulation, (a measure of image contrast) has decreased over most of the spatial frequencies. However, with the use of an individual micro-actuator as illustrated by FIG. 2 to adjust the lateral position of the lens 118 in accordance with the present invention, the performance of objective 118 can be corrected to that shown in FIG. 7(b) and FIG. 7(c).

Figure 9A:
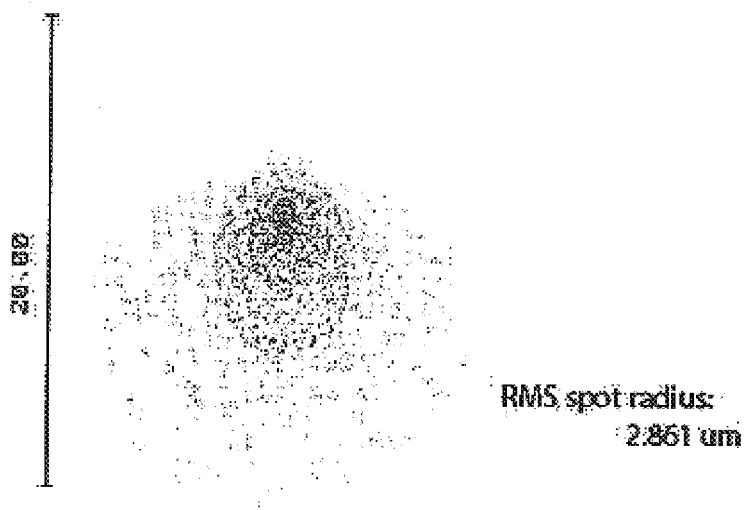
FIG. 9(a) is a spot diagram for one of the elements of an array as illustrated in FIG. 7(a) wherein one lens of one of the elements has front-and-back surface misalignment.
Figure 9B:
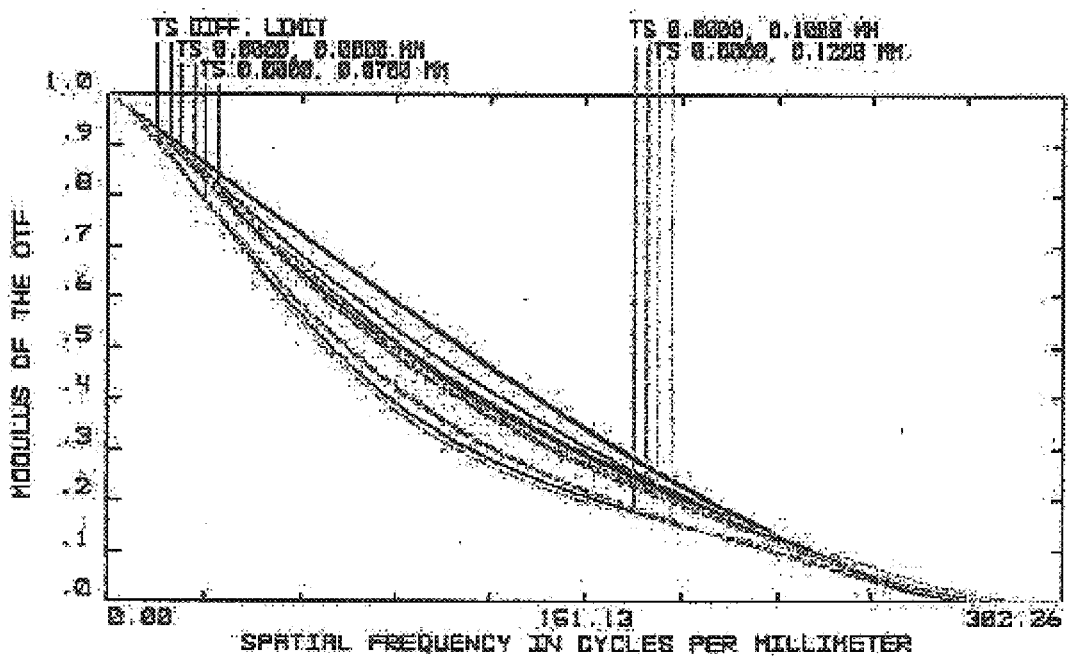
FIG. 9(b) is an MTF plot of the lens element referred to in FIG. 9(a).
Figure 9C:
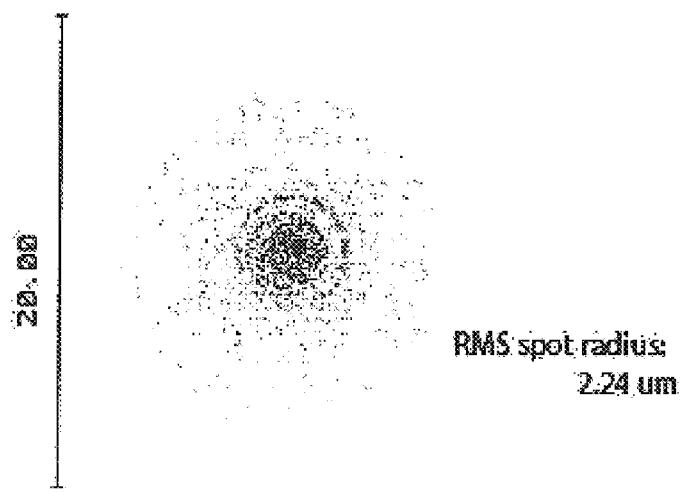
FIG. 9(c) is a spot diagram for the lens element referred to in FIG. 9(a) wherein the misaligned lens has been laterally adjusted.
Figure 9D:
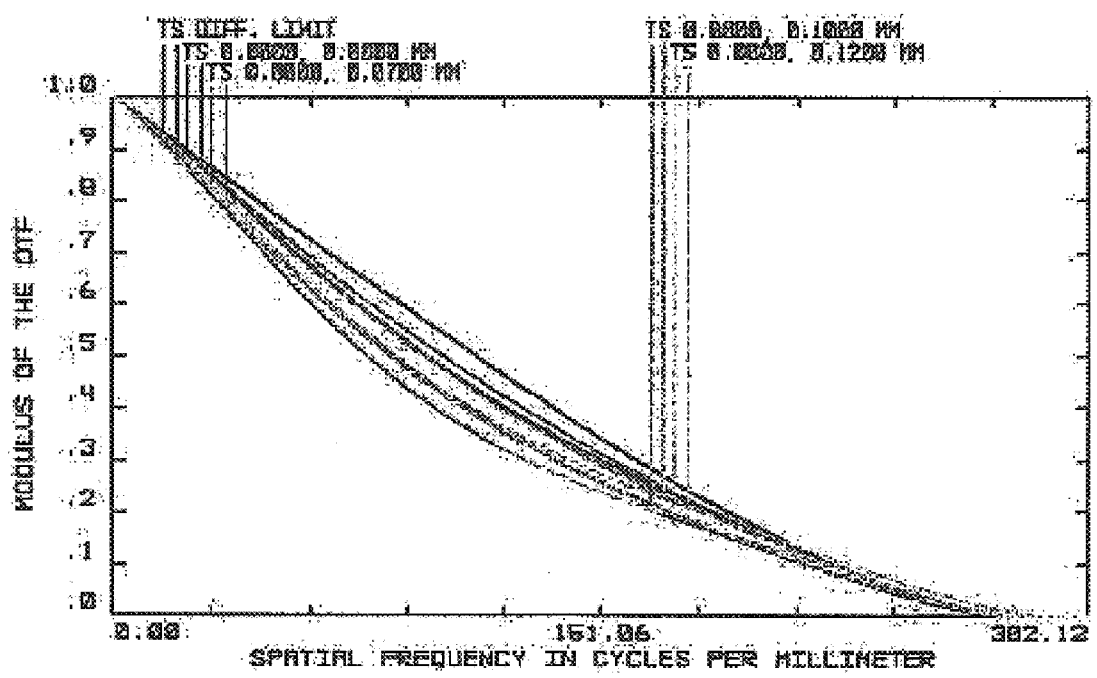
FIG. 9(d) is an MTF plot for the lens element of FIG. 9(c).

Lateral adjustment of individual lenses can also be used to compensate for front-to-back surface misalignment of individual lenses caused by fabrication error. For example, the spot diagram of FIG. 9(a) and the MTF plot of FIG. 9(b) show the uncompensated response of an objective of the array where the front surface of a bottom lens is laterally misaligned from the back surface thereof by 10 micrometers. The spot diagram and MTF plot in this case show degradation in comparison to FIG. 7(b) and FIG. 7(c). However, this kind of degradation can be partially corrected by laterally adjusting the individual lens having surface misalignment in accordance with the present invention. FIG. 9(c) shows the spot diagram and FIG. 9(d) shows the MTF plot of the individual objective after lateral adjustment of the lens having surface misalignment by approximately 1.2 micrometers.

A micro-actuator can also be used to translate individual lenses axially to vary the focal lengths of respective microscope elements of a miniature microscope array. This is advantageous because image quality may vary from array element-to-array element due to fabrication and assembly errors, as well, for example, as object surface and cover glass thickness variations.

An array microscope preferably uses a single detector array. However, this prevents the focus for each microscope from being independently adjusted. If some lenses in the array microscope have a slightly different surface shape, thickness, or index-of-refraction from other corresponding lenses in the array due to fabrication error, then the image from the objectives that contain those lenses will be defocused at the detector plane and will appear blurry. This problem can be solved if each corresponding lens of one or more arrays can be adjusted independently in the axial direction.

Figure 10A:
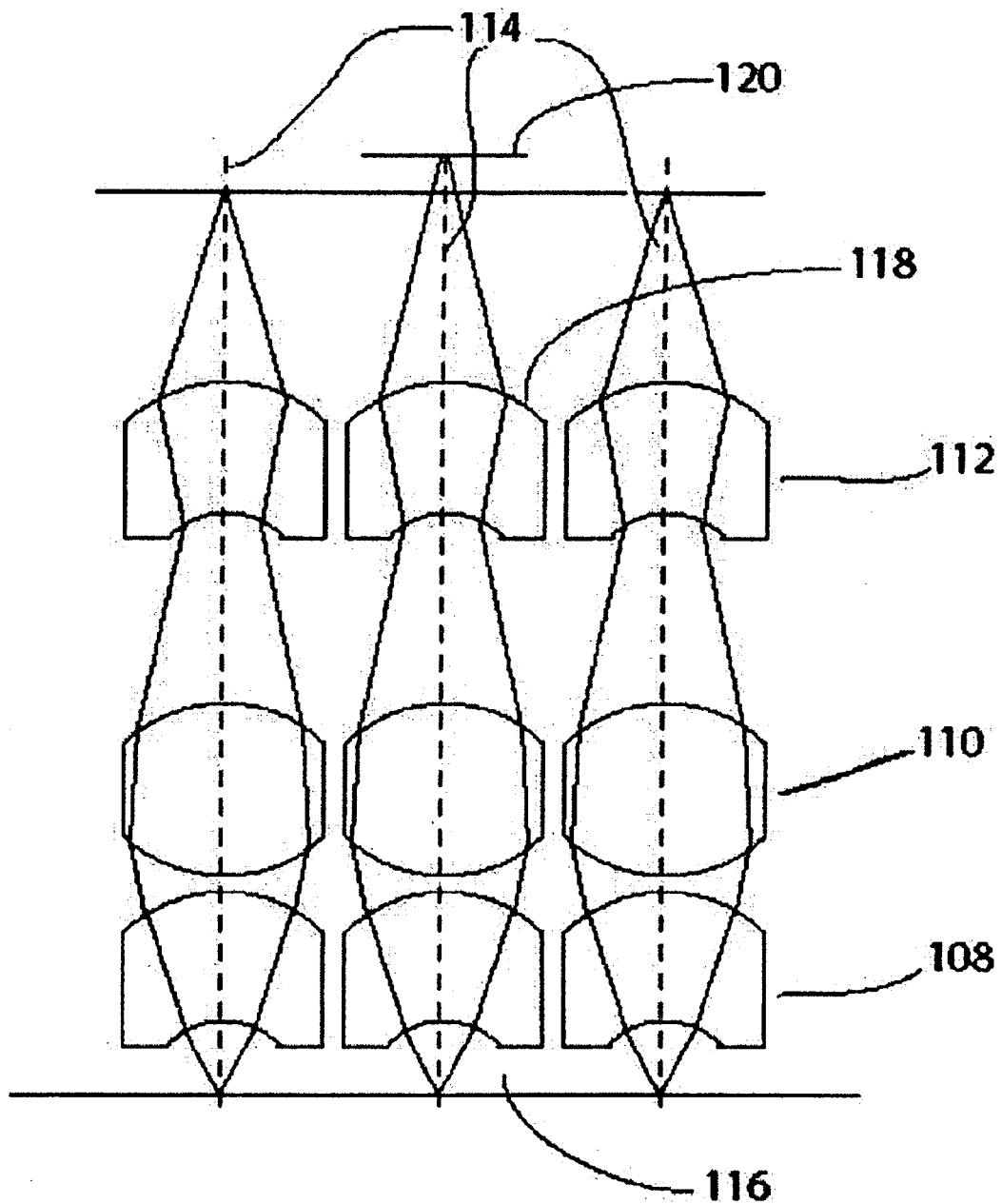
FIG. 10(a) is a cross section of three elements of an array microscope wherein one lens of one of the elements is has a radius of curvature error.
Figure 10B:
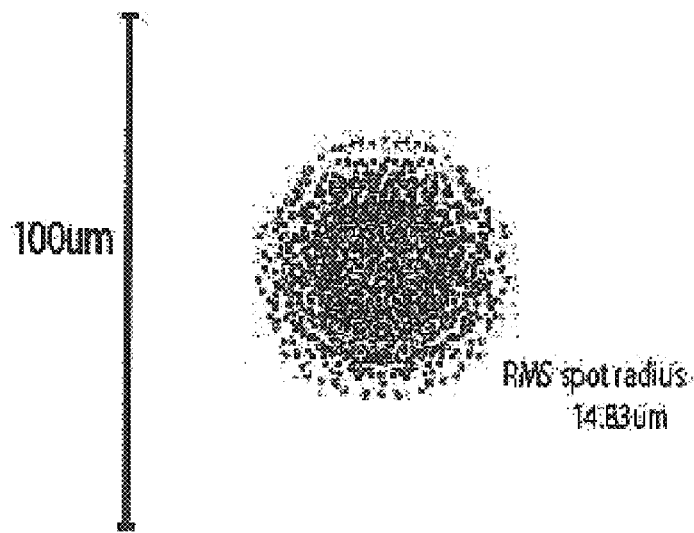
FIG. 10(b) is a geometric spot diagram for the element of the array shown in FIG. 10(a) wherein in one lens is decentered.
Figure 10C:
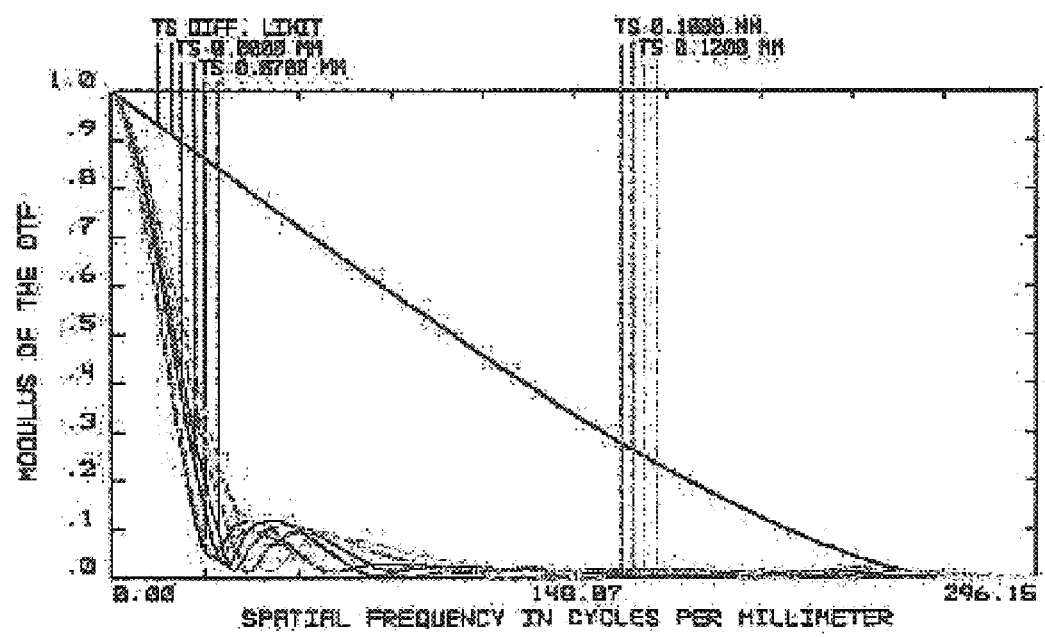
FIG. 10(c) is an MTF plot for the element of the array shown in FIG. 10(a) wherein one element is decentered.
Figure 10D:
FIG. 10(d) is a spot diagram for the lens element of FIG. 10(a) after axial adjustment of the lens having the curvature error.
Figure 10E:
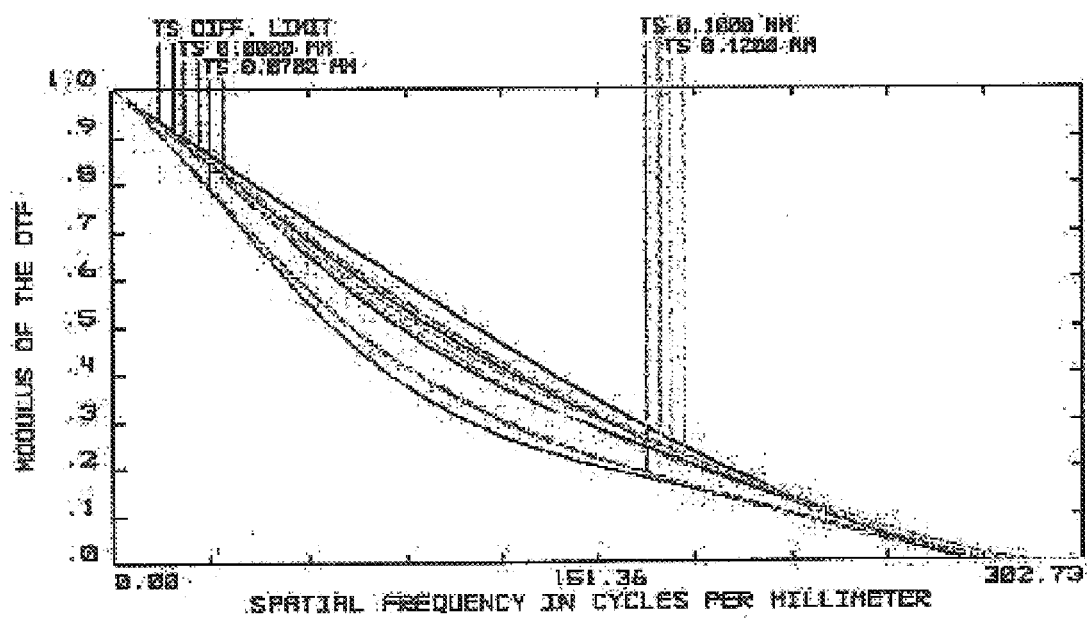
FIG. 10(e) is an MTF plot for the lens element of FIG. 10(d).

For example, FIG. 10(a) shows the cross section of three elements of an array microscope and rays traced through the objectives with the first lens 116 of the center objective 118 having a 0.5% error in its radius of curvature. Table 2 shows the prescription data for the microscope objective in the case of 0.5% surface error in the bottom lens. The optimal image plane 120 for that particular objective is shifted with respect to the image plane 120 at the other two objectives. If the detector array is fixed at the image plane 120, then the image from the center objective will be blurred out as shown in the geometric spot diagram in FIG. 10(b). That is, the spot size is significantly larger compared to the case where there is no surface error, show in FIG. 7(b). The effect of the surface error can also be seen through the MTF plot in FIG. 10(c). If axial adjustment of individual lenses can be implemented, then significant improvement can be obtained. The spot diagram and MTF plots of FIG. 10(d) and FIG. 10(e), respectively, show the optical performance of the microscope with the surface error, but with the bottom lens axially adjusted by approximately 3.4 microns

TABLE 2

| Surf | Radius | Thickness | Glass | Diameter | Conic | 4th order | 6th order |
|---|---|---|---|---|---|---|---|
| OBJ | Infinity | 0.1500 | BK7 | 0.240 | 0 | | |
| 1 | Infinity | 0.2038 | | 0.386 | 0 | | |
| 2 | −1.422 | 1.0000 | ZEONEXE48R | 0.644 | 0 | | |
| 3 | −0.741 | 0.0500 | | 1.386 | −0.23 | | |
| 4 | 1.871 | 1.7000 | ZEONEXE48R | 1.601 | −2.82 | | |
| STO | −1.66 | 2.8440 | | 1.497 | 0 | 0.018 | 0.017 |
| 6 | −0.621 | 1.0000 | ZEONEXE48R | 0.982 | 0 | | |
| 7 | −1.276 | 2.2939 | | 1.580 | 0.5 | | |
| IMA | Infinity | | | 1.717 | 0 | | |

Figure 11A:
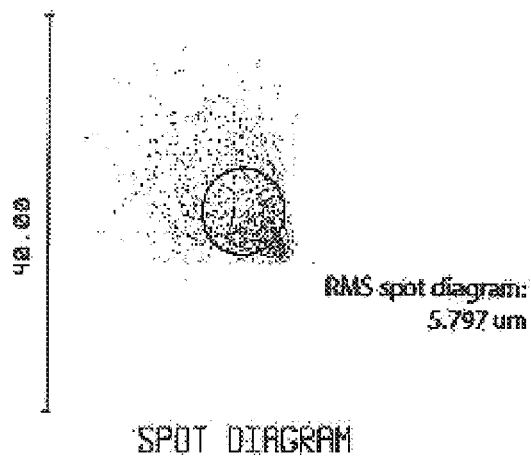
FIG. 11(a) is an RMS spot diagram for the element of the array shown in FIG. 10(a) wherein one lens of the element is tilted with respect to the optical axis of the element.
Figure 11B:
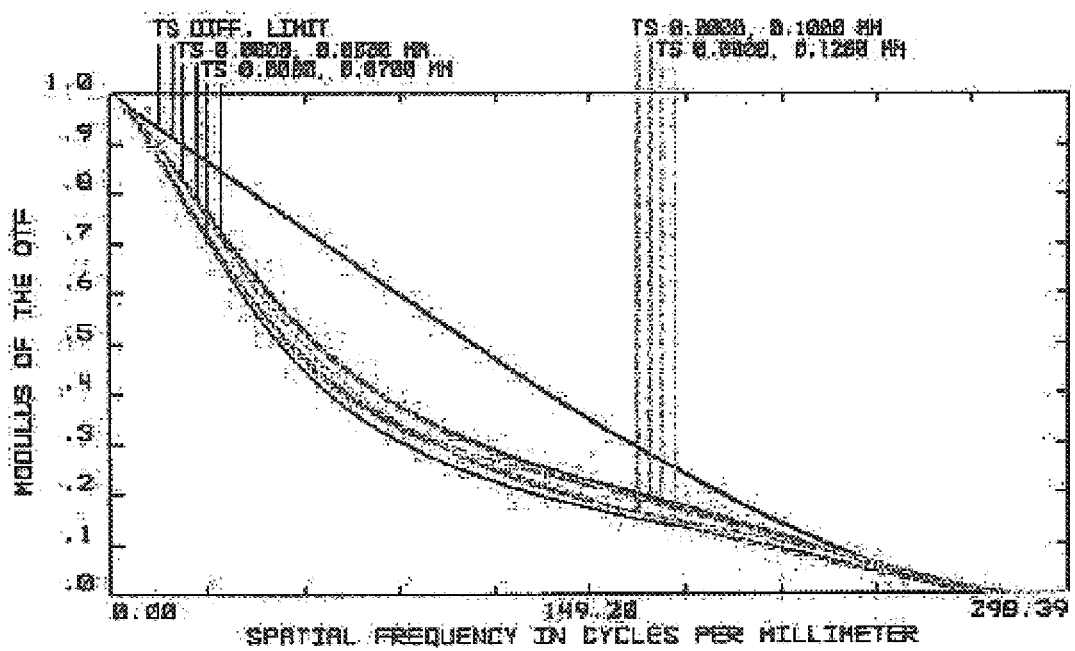
FIG. 11(b) is an MTF plot for the element of the array shown in FIG. 10(a) wherein one element is decentered.
Figure 11C:
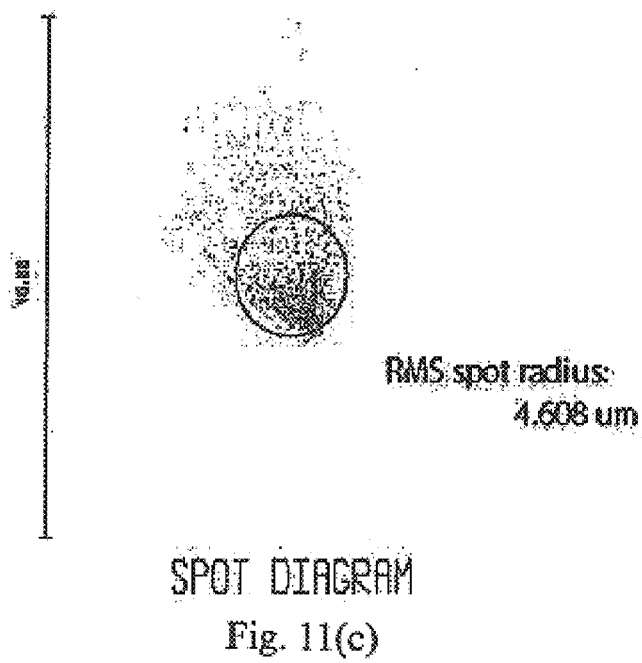
FIG. 11(c) is a geometric spot diagram for the lens element of FIG. 11(a) after rotation of the tilted lens.
Figure 11D:
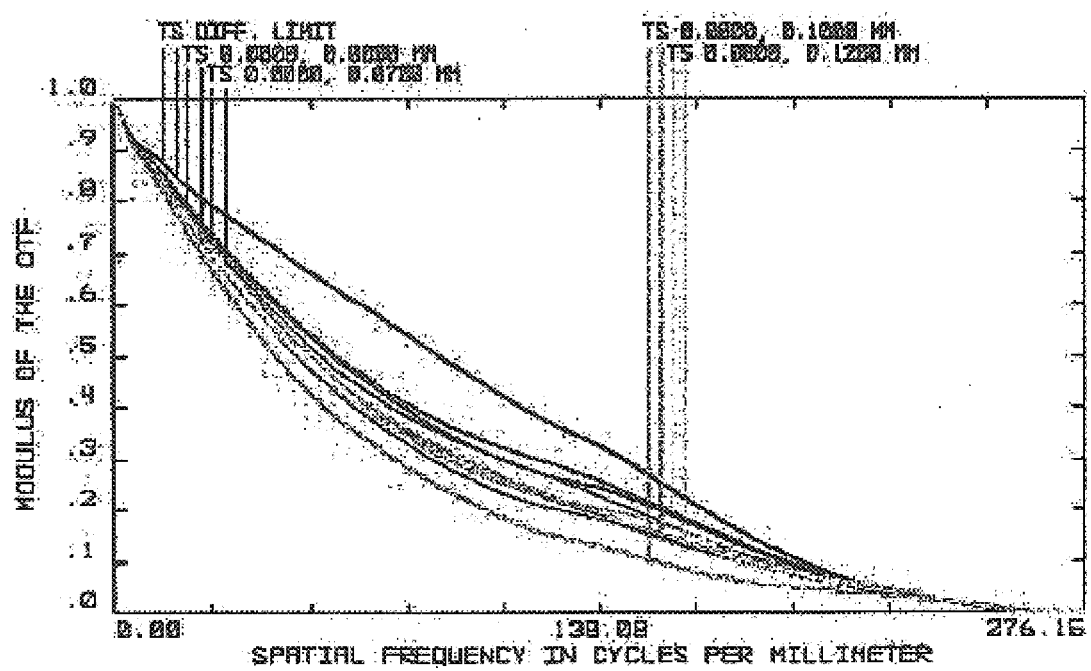
FIG. 11(d) is an MTF plot for the lens element of FIG. 11(d).

Rotation of one or more lenses of a circularly symmetric objective lens system with respect to the optical axis of the system can be used to compensate partially for fabrication and assembly errors, as is done, for example, in lithography optics and astronomical optics. This technique can be implemented with an array microscope by rotating individual lenses of the array using micro-actuators. For example, the actual performance of the microscope objective of Table 1 and FIG. 7(a) will degrade if one of the lenses is de-centered or if the front surface-to-back surface alignment of a lens is poor. FIG. 11(a) and FIG. 11(b) show the geometric spot diagram and MTF plot, respectively, for the microscope objective of Table 1 where the middle lens has 0.2° tilt in the two directions orthogonal to the optical axis. However, the optical performance can be improved if one of the lenses is allowed to rotate. FIGS. 11(c) and 11(d) show the spot diagram and MTF plot, respectively, for the case where the middle lens 122 is rotated by approximately 24° clockwise. Rotation of individual lenses for such compensation may be selectively accomplished using a micro-actuator device of the type shown schematically in FIG. 4.

Figure 12:
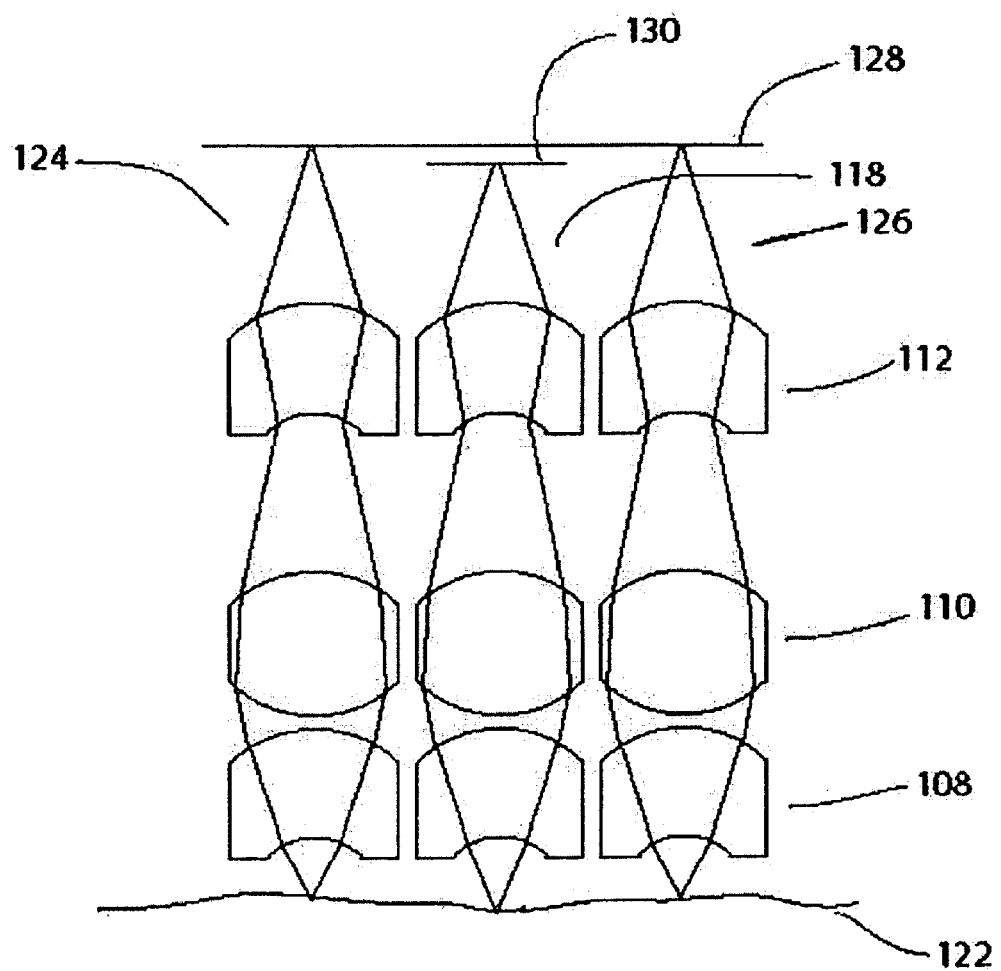
FIG. 12 is a cross section of three elements of an array microscope disposed in relation to a specimen slide having surface irregularity.

Another type of imaging problem may occur because microscope slides are not perfectly flat. A typical microscope slide may have up to a few micrometers of surface irregularity over its entire surface. For a conventional microscope this level of surface irregularity does not cause a major problem. This is because a conventional microscope only has a field of view ("FOV") of a few hundred microns and over this limited FOV the slide is very flat relative to the depth of the field of the microscope. However, an array microscope may have a lateral FOV that expands over 20 mm, and over that area the surface irregularity of a typical slide may cause significant image degradation. FIG. 12 shows how the surface irregularity of a slide 122 can cause images formed by individual objectives to be located at different axial positions. The amount of image shift is approximately related to the amount of object distance variation by the square of the transverse magnification of the microscope objective. If a fixed detector array is used then images from some objectives will be defocused. Thus, in FIG. 12, the two outer microscope elements 124 and 126 produce images at plane 128, while the center element 118 produces an image at plane 130 because the object in the FOV of the central element is further away from the array. One solution to this problem is to adjust one or more lenses axially for the microscopes that have a defocused image. A micro-actuator can be used to make the adjustment, as described above with respect to FIG. 3.

The adjustment can be passive or active. In the case of passive adjustment, the surface profile of the slide is measured first, and corresponding adjustments for each lens are pre-programmed. In the case of active adjustment, the adjustment is made in real-time based on image quality. In either case, the adjustment process starts with a choice of the parameter or set of parameters, known as a "merit function," that are to guide the adjustment process. Typically, the merit function is a single value that reflects the desired final performance of the optical system. For example, if the objective is to be used in pathology, the point spread function ("PSF"), modulation transfer function ("MTF") at one or more spatial frequencies, chromatic aberration, or other parameters can be chosen for this purpose. In general, the merit function is a weighted average of many parameters. However, it is often important to minimize the number of evaluated parameters because of the complexity and time needed to evaluate all of the parameters.

For example, optimization may be based on evaluation of the PSF using a "tilted edge method" described in "Measurement of the modulation transfer function of infrared cameras," *Optical Engineering*, June 1995, Vol. 34, No. 6, pp. 1808–1817, hereby incorporated by reference in its entirety. The full width half maximum ("FWHM") of the PSF is used as a guiding parameter. An optimization process can be complex and there are many well-known methods of finding the minimum of a function. In practice, the entire process is conducted under the supervision of a computer program. This allows automating the procedure and shortening the evaluation time. First, the global minimum is found. After initial evaluation of imaging performance a decision is made as to whether the performance fulfills the requirements. If not, an adjustment is made to the optical system and the measurement process is repeated until the image quality is satisfactory. At this point, the lens position is memorized by the control program and the position of the element used in the adjustment is fixed. These steps can be implemented automatically using general-purpose laboratory equipment. A process for finding the minimum of a multi-variable function is outlined, for example, in Numerical Recipes in C, (Press et al., ISBN 0-521-43108-5, Cambridge University Press), hereby incorporated by reference in its entirety.

Figure 13A:
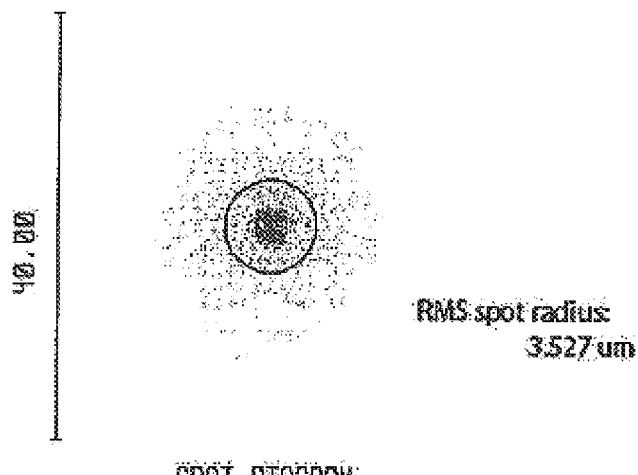
FIG. 13(a) is a geometric spot diagram for an array lens element designed for a 150 micrometer glass slide cover when a 170 micrometer cover is used instead.
Figure 13B:
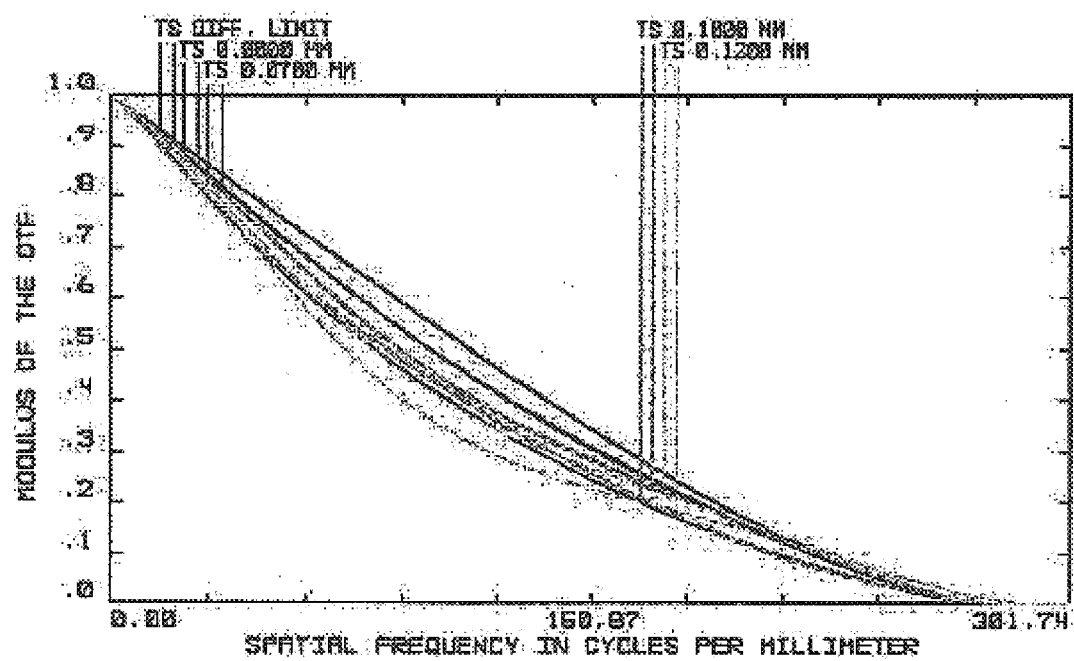
FIG. 13(b) is an MTF plot for the array element of FIG. 13(a).
Figure 14A:
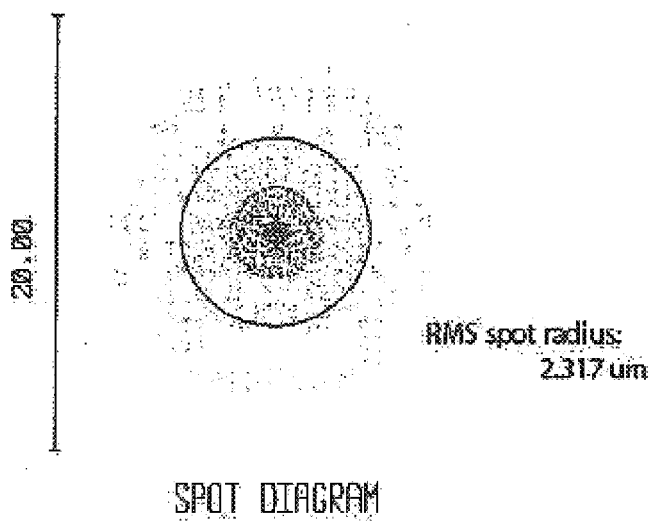
FIG. 14(a) is a spot diagram for the array lens element of FIG. 13(a) wherein the bottom lens thereof has been axially adjusted.
Figure 14B:
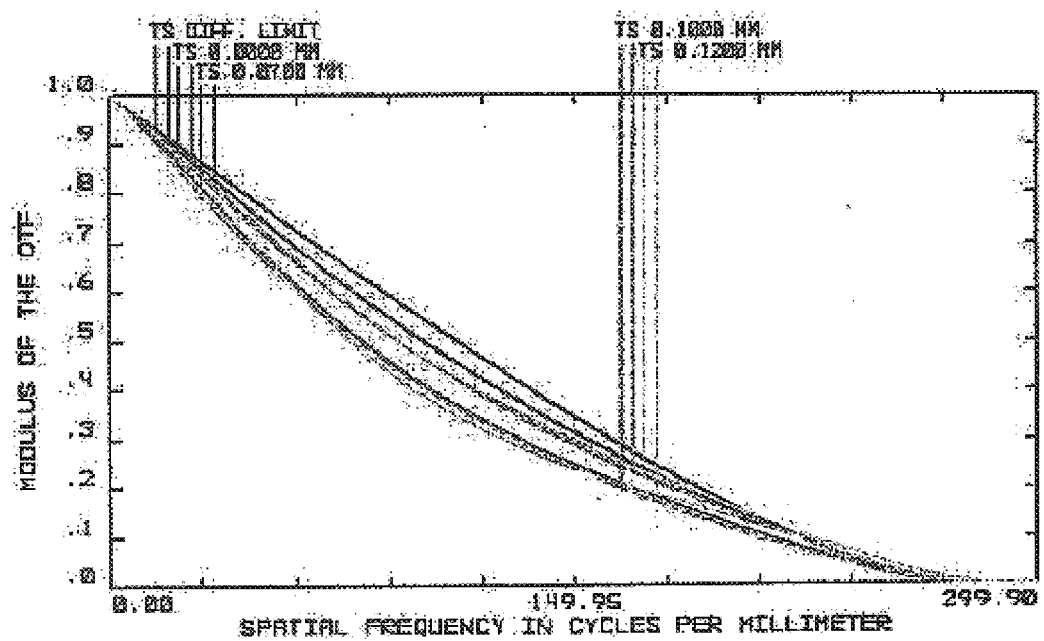
FIG. 14(b) is an MTF plot for the array element of FIG. 13(a) wherein the bottom lens thereof has been axially adjusted.

A cover glass is almost always used for biological slides. However, cover glass thickness typically ranges from 130 um to 200 um. A high numerical aperture ("NA") microscope objective is sensitive to cover glass thickness. A particular objective is generally designed to image slides with a specific cover glass thickness. If the thickness of the cover glass is different from the design value, addition aberrations, for example, spherical aberration, can be introduced. For a single microscope objective this problem is typically solved by allowing one or more lenses to be moved axially by rotating an adjustment ring on the objective casing. For an array microscope, this problem can be solved by allowing one or more of the lenses in the elements of the array to be individually axially adjusted, while leaving the array itself fixed. Adjustment of each lens can be accomplished by using a micro-actuator. For example, the microscope objective of Table 1 is designed for a 150 μm thick cover glass. If a cover glass of different thickness is used, for example a 170 um thick cover glass, the microscope objective prescription changes as shown by the thickness specification from surface 7 to the image in Table 3. The thickness specification is shorter than in Table 1 because of the increased optical path distance between the object and the first lens due to the additional thickness of the high index slide cover. In this case, the image quality will be degraded, as shown by the spot diagram of FIG. 13(a) and MTF plot of FIG. 13(b). However, one of the lenses can be adjusted axially to compensate for the effect of the additional cover glass thickness. For example, if the bottom lens is axially translated by 33 μm, the optical performance is improved, as shown by the surface 7-to-image thickness in Table 4, the spot diagram of FIG. 14(a), and the MTF plot of FIG. 14(b).

TABLE 3

| Surf | Radius | Thickness | Glass | Diameter | Conic | 4th order | 6th order |
|---|---|---|---|---|---|---|---|
| OBJ | Infinity | 0.1500 | BK7 | 0.240 | 0 | | |
| 1 | Infinity | 0.1887 | | 0.386 | 0 | | |
| 2 | −1.422 | 1.0000 | ZEONEXE48R | 0.644 | 0 | | |
| 3 | −0.737 | 0.0500 | | 1.386 | −0.23 | | |
| 4 | 1.871 | 1.7000 | ZEONEXE48R | 1.601 | −2.82 | | |
| STO | −1.66 | 2.8440 | | 1.497 | 0 | 0.018 | 0.017 |
| 6 | −0.621 | 1.0000 | ZEONEXE48R | 0.982 | 0 | | |
| 7 | −1.276 | 2.2552 | | 1.580 | 0.5 | | |
| IMA | Infinity | | | 1.717 | 0 | | |

TABLE 4

| Surf | Radius | Thickness | Glass | Diameter | Conic | 4th order | 6th order |
|---|---|---|---|---|---|---|---|
| OBJ | Infinity | 0.1500 | BK7 | 0.240 | 0 | | |
| 1 | Infinity | 0.1826 | | 0.386 | 0 | | |
| 2 | −1.422 | 1.0000 | ZEONEXE48R | 0.644 | 0 | | |
| 3 | −0.737 | 0.0831 | | 1.386 | −0.23 | | |
| 4 | 1.871 | 1.7000 | ZEONEXE48R | 1.601 | −2.82 | | |
| STO | −1.66 | 2.8440 | | 1.497 | 0 | 0.018 | 0.017 |
| 6 | −1.621 | 1.000 | ZEONEXE48R | 0.982 | 0 | | |
| 7 | −1.276 | 2.2309 | | 1.580 | 0.5 | | |
| IMA | Infinity | | | 1.717 | 0 | | |

Figure 15A:
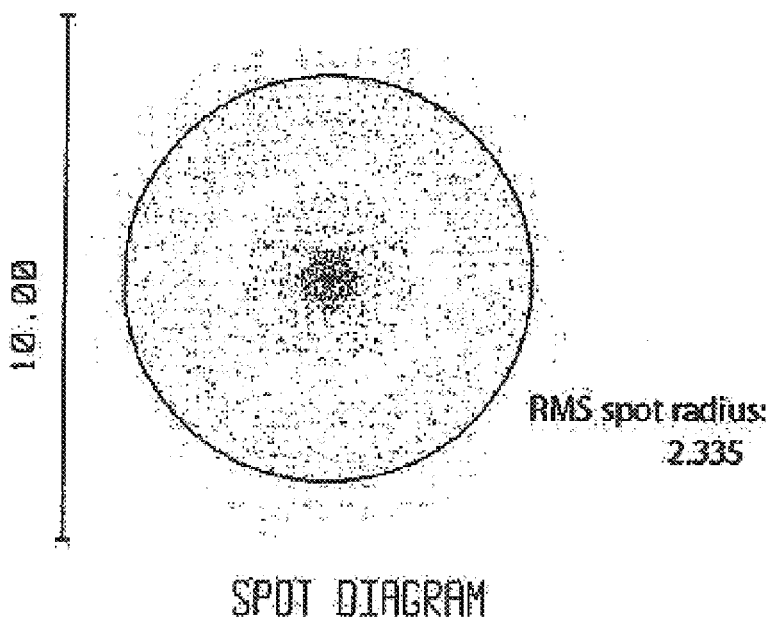
FIG. 15(a) is a 525 nm wavelength spot diagram for an array lens element for use at a wavelength of 592 nm, wherein the bottom lens of the lens element has been axially translated to compensate for the difference in wavelength.
Figure 15B:
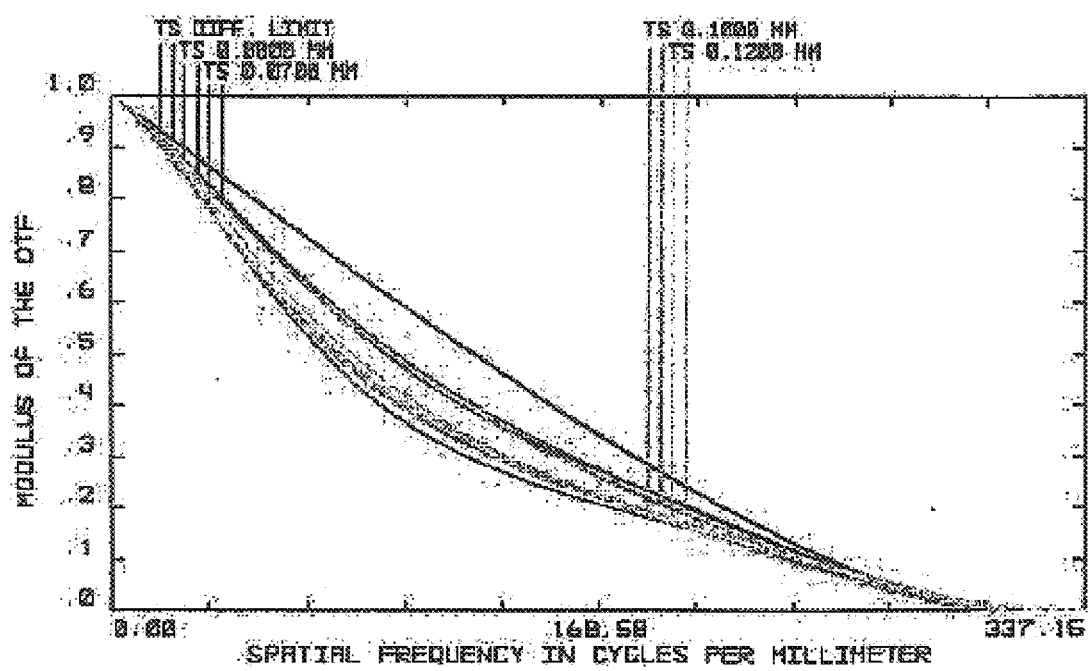
FIG. 15(b) is an MTF plot for the lens element of FIG. 15(a).

The present invention also enables axial translation of individual lenses of an array microscope to compensate for chromatic aberration caused by dispersion properties of optical material. The design of array microscope optics can require a compromise between achromatic correction of the objectives and manufacturability. As a result imaging with a large spectral bandwidth may be impaired by less than perfect chromatic correction. To acquire a full-color image of a sample, such as a pathology slide, the imaging must be done at multiple spectral band wavelengths. This can be achieved by adjusting one or more lenses in the objective axially, using micro-actuators as described above, to compensate for the change in imaging properties of the lens as with wavelength. Since the previously described problems of radius of curvature variation, slide surface variation and cover glass thickness variation may exist, it is advantageous to be able to make axial adjustments for chromatic aberration independently for each array microscope element. For example, the microscope objective of Table 1 is designed for a narrow spectral band centered on λ=592 nm. If the same microscope objective is to be use for a different center wavelength, for example, λ=525 nm, good optical performance can be obtained if the bottom lens can be axially adjusted. Table 5 shows the prescription data for the microscope objective operating at λ=525 nm. The bottom lens is translated 8 μm away the middle lens. The resulting performance is shown by the spot diagram of FIG. 15(a) and the MTF plot of FIG. 15(b).

TABLE 5

| Surf | Radius | Thickness | Glass | Diameter | Conic | 4th order | 6th order |
|---|---|---|---|---|---|---|---|
| OBJ | Infinity | 0.1500 | BK7 | 0.240 | 0 | | |
| 1 | Infinity | 0.1920 | | 0.386 | 0 | | |
| 2 | −1.422 | 1.0000 | ZEONEXE48R | 0.644 | 0 | | |
| 3 | −0.737 | 0.0580 | | 1.386 | −0.23 | | |
| 4 | 1.871 | 1.700 | ZEONEXE48R | 1.601 | −2.82 | | |
| STO | −1.66 | 2.8440 | | 1.497 | 0 | 0.018 | 0.017 |
| 6 | −0.621 | 1.0000 | ZEONEXE48R | 0.982 | 0 | | |
| 7 | −1.276 | 2.29388 | | 1.580 | 0.5 | | |
| IMA | Infinity | | | 1.717 | 0 | | |

The terms and expressions that have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow.

What is claimed is:

1. A multiple-axis imaging system having individually-adjustable optical elements, comprising:

a plurality of optical elements having respective optical axes and being individually disposed with respect to one another to image respective sections of an object; and a plurality of individually-operable positioning devices corresponding to respective said optical elements for positioning said optical elements with respect to their respective optical axes.

2. The imaging system of claim 1, wherein said positioning devices are adapted to position said respective optical elements with respect to respective image planes.

3. The imaging system of claim 2, wherein said positioning devices are adapted to adjust the position of said respective optical elements along respective optical axes to place the image planes of respective said optical elements co-planar with images formed by other said optical elements.

4. The imaging system of claim 1, wherein said positioning devices are adapted to adjust the axial position of said respective optical elements with respect to their respective optical axes.

5. The imaging system of claim 4, wherein said optical elements comprise a part of a system of optical elements associated with respective optical axes, and said positioning devices are adapted to adjust the axial position of one part of a system with respect to the axial position of another part of the system.

6. The imaging system of claim 4, wherein said positioning devices are further adapted to adjust the lateral positions of said respective optical elements with respect to their respective optical axes.

7. The imaging system of claim 6, wherein said optical elements comprises a part of a system of optical elements associated with respective optical axes, and said positioning devices are further adapted to adjust the axial and lateral positions of one part of a system with respect to the axial and lateral positions another part of the system.

8. The imaging system of claim 6, wherein said positioning devices are further adapted to adjust the angular orientation of said respective optical elements about their respective optical axes.

9. The imaging system of claim 8, wherein said optical elements comprise a part of a system of optical elements associated with respective optical axes, and said positioning devices are further adapted to adjust the axial position, lateral position and angular orientation of one part of a system with respect to the axial position, lateral position and angular orientation of another part of the system.

10. The imaging system of claim 1, wherein said positioning devices are adapted to adjust the lateral positions of said respective optical elements with respect to their respective optical axes.

11. The imaging system of claim 10, wherein said optical elements comprise a part of a system of optical elements associated with respective optical axes, and said positioning devices are further adapted to adjust the lateral positions of one part of a system with respect to the lateral positions of another part of the system.

12. The imaging system of claim 1, wherein said positioning devices are adapted to adjust the angular orientation of said respective optical elements about their respective optical axes.

13. The imaging system of claim 12, wherein said optical elements comprise a part of a system of optical elements associated with respective optical axes, and said positioning devices are further adapted to adjust the angular orientation of one part of a system with respect to the angular orientation of another part of the system.

14. The imaging system of claim 1, wherein said plurality of optical elements comprise microscope elements so as to form a microscope array.

15. The microscope array of claim 14, wherein said positioning devices are adapted to position said respective microscope elements with respect to respective image planes.

16. The microscope array of claim 15, wherein said positioning devices are adapted to adjust the position of said respective microscope elements along respective optical axes to place the image planes of respective said microscope elements co-planar with images formed by other said microscope elements.

17. The microscope system of claim 14, wherein said positioning devices are adapted to adjust the axial position of said respective microscope elements with respect to their respective optical axes.

18. The microscope system of claim 17, wherein said microscope elements comprise a part of a system of microscope elements associated with respective optical axes, and said positioning devices are adapted to adjust the axial position of one part of a system with respect to the axial position of another part of the system.

19. The microscope system of claim 14, wherein said positioning devices are further adapted to adjust the lateral positions of said respective microscope elements with respect to their respective optical axes.

20. The microscope system of claim 19, wherein said microscope elements comprise a part of a system of microscope elements associated with respective optical axes, and said positioning devices are further adapted to adjust the axial and lateral positions of one part of a system with respect to the axial and lateral positions another part of the system.

21. The microscope system of claim 14, wherein said positioning devices are further adapted to adjust the angular orientation of one or more of said respective microscope elements about their respective optical axes.

22. The microscope system of claim 21, wherein said microscope elements comprise a part of a system of microscope elements associated with respective optical axes, and said positioning devices are further adapted to adjust the axial position, lateral position and angular orientation of one part of a system with respect to the axial position, lateral position and angular orientation of another part of the system.

23. The microscope array of claim 14, wherein said positioning devices comprises micro-actuators.

24. The microscope array of claim 23, further comprising a circuit for electrically energizing and controlling said micro-actuators selectively.

25. The microscope array of claim 24, wherein said micro-actuators are constructed using a LIGA process.

26. The microscope array of claim 23, wherein said micro-actuators are constructed using a LIGA process.

27. A method for modifying the quality of images produced by a multi-axis imaging system having a plurality of optical elements and respective optical axes, comprising adjusting the position of one or more of the optical elements individually with respect to their respective optical axes so as to modify their respective image qualities at a common image plane.

28. The method of claim 27, including adjusting the axial positions of the optical elements with respect to their respective optical axes to modify image quality.

29. The method of claim 28, wherein the optical elements comprises a part of a system of optical elements associated with respective optical axes, and said method includes adjusting the axial position of one part of a system with respect to the axial position of another part of the system.

30. The method of claim 27, including adjusting the lateral positions of the respective optical elements with respect to their respective optical axes to modify image quality.

31. The method of claim 30, wherein the optical elements comprises a part of a system of optical elements associated with respective optical axes, and said method includes adjusting the lateral position of one part of a system with respect to the lateral position of another part of the system.

32. The method of claim 27, including adjusting the angular orientations of one or more respective optical elements about their respective optical axes to modify image quality.

33. The method of claim 32, wherein the optical elements comprises a part of a system of optical elements associated with respective optical axes, and said method includes adjusting the angular orientation of one part of a system with respect to the angular orientation of another part of the system.

34. The method of claim 27, further comprising selecting and arranging the optical elements so as to perform as microscope elements.

35. The method of claim 34, including adjusting the axial positions of respective microscope elements with respect to the common image plane to compensate for fabrication error in one or more of the microscope elements.

36. The method of claim 35, wherein said adjusting is made by a predetermined amount based on one or more measured parameters of respective microscope elements.

37. The method of claim 34, including adjusting the axial positions of respective microscope elements with respect to the common image plane to compensate for assembly error in one or more of the microscope elements.

38. The method of claim 34, including adjusting the lateral positions of said respective microscope elements to compensate for fabrication error in one or more of the microscope elements.

39. The method of claim 38, wherein said adjusting is made by a predetermined amount based on one or more measured parameters of respective microscope elements.

40. The method of claim 34, including adjusting the lateral positions of respective microscope elements with respect to the common image plane to compensate for assembly error in one or more of the microscope elements.

41. The method of claim 34, including rotating respective optical elements with respect to respective optical exes to compensate for fabrication error in one or more of the microscope elements.

42. The method of claim 41, wherein said adjusting is made by a predetermined amount based on one or more measured parameters of respective microscope elements.

43. The method of claim 42, including rotating respective microscope elements with respect to respective optical axes to compensate for assembly error in one or more of the microscope elements.

44. The method of claim 34, wherein the microscope elements comprises a part of a system of optical elements associated with respective optical axes, said method including adjusting the lateral position of one or more respective microscope elements with respect to their respective optical axes to compensate for misalignment of one or more elements of a system.

45. The method of claim 34, wherein said adjusting is made to maintain transverse magnification between different wavelengths.

46. The method of claim 34, wherein said adjusting is made to change the working distance of the microscope to compensate for object irregularity.

47. The method of claim 46, wherein said adjusting is made based on measurement of the surface profile of the object.

48. The method of claim 46, wherein said adjusting is made in based on analysis of the quality of the image produced by a microscope element.

49. The method of claim 34, wherein said adjusting is made by altering the axial position of a respective microscope element to compensate for the thickness of an object.

50. The method of claim 34, wherein said adjusting is made by altering the axial position of a respective microscope element to reduce the effect of spherical aberration of the microscope that contains said microscope element due to cover glass thickness variation.

* * * * *